(12) United States Patent
Mariani et al.

(10) Patent No.: US 10,085,437 B2
(45) Date of Patent: Oct. 2, 2018

(54) SUPPORT FOR A SPREADING BOOM FOR AN AGRICULTURAL SPRAYER

(71) Applicant: KING AGRO EUROPA S.L., Picassent, Valencia (ES)

(72) Inventors: Guillermo Mariani, Valencia (ES); Gabriel Mariani, Valencia (ES)

(73) Assignee: KING AGRO EUROPA S.L., Picassent, Valencia (ES)

( * ) Notice: Subject to any disclaimer, the term of this patent is extended or adjusted under 35 U.S.C. 154(b) by 313 days.

(21) Appl. No.: 15/035,442

(22) PCT Filed: Nov. 8, 2013

(86) PCT No.: PCT/ES2013/070771
§ 371 (c)(1),
(2) Date: May 9, 2016

(87) PCT Pub. No.: WO2015/067829
PCT Pub. Date: May 14, 2015

(65) Prior Publication Data
US 2016/0286781 A1   Oct. 6, 2016

(51) Int. Cl.
*B05B 1/20* (2006.01)
*A01M 7/00* (2006.01)
*B05B 1/18* (2006.01)

(52) U.S. Cl.
CPC ........ *A01M 7/0082* (2013.01); *A01M 7/0053* (2013.01); *A01M 7/0071* (2013.01); *A01M 7/0075* (2013.01); *B05B 1/185* (2013.01)

(58) Field of Classification Search
CPC .............. A01M 7/0071; A01M 7/0082; A01M 7/0053; A01M 7/0075; B05B 1/185
(Continued)

(56) References Cited

U.S. PATENT DOCUMENTS 4,711,398 A * 12/1987 Ganderton .......... A01M 7/0071
239/167
8,939,383 B2 * 1/2015 Honermann ........ A01M 7/0071
239/167
(Continued)

FOREIGN PATENT DOCUMENTS

AU     2013202211 A1   10/2013
EP        191637 A2    8/1986
(Continued)

OTHER PUBLICATIONS

Jun. 20, 2017—(EP) European Search Report—App EP 13896945.6 (8 pages).
Jul. 1, 2014—(WO) International Search Report—PCT/ES2013/070771.

*Primary Examiner* — Steven J Ganey
(74) *Attorney, Agent, or Firm* — Banner & Witcoff, Ltd.

(57) ABSTRACT

A sprayer boom support for an agricultural sprayer including two articulated arms that are coupled in an articulated manner on both sides of the sprayer, wherein each articulated arm is comprised of bar sections that are formed in a composite material consisting of a reinforcing agent chosen from carbon fibre, fibreglass, aramid fibre, boron fibre or a combination thereof, and a matrix of epoxy, vinyl ester, phenolic or polyester resin, the bar sections having a tube geometry with a substantially rectangular cross section with rounded vertices and arched sides, the length of two of its equal sides being constant along the bar section.

16 Claims, 6 Drawing Sheets

(58) Field of Classification Search
USPC .............. 239/159, 164, 165, 166, 167, 600
See application file for complete search history.

(56) References Cited

U.S. PATENT DOCUMENTS

| | | | |
|---|---|---|---|
| 9,155,295 B2 * | 10/2015 | Bouten | ............... A01M 7/0071 |
| 2012/0273590 A1 | 11/2012 | Honermann et al. | |
| 2012/0273626 A1 | 11/2012 | Bouten | |
| 2015/0122911 A1 * | 5/2015 | Honermann | ........ A01M 7/0071 |
| | | | 239/159 |

FOREIGN PATENT DOCUMENTS

| | | |
|---|---|---|
| EP | 1468605 A1 | 10/2004 |
| FR | 2614560 A2 | 11/1988 |
| GB | 2098842 A | 12/1982 |

* cited by examiner

SUPPORT FOR A SPREADING BOOM FOR AN AGRICULTURAL SPRAYER

TECHNICAL FIELD OF THE INVENTION

This invention lies within the field of agricultural sprayers, whether towed or self-propelled.

Said invention relates particularly to the support structure for the sprayer boom for spraying liquid that is arranged on the chassis of said agricultural sprayers.

BACKGROUND OF THE INVENTION

It is known that agricultural sprayers are machines that are widely used to spray a treatment product onto plants as small droplets, for example, phytosanitary products or pesticides that prevent the action of plagues or destroy them directly, as well as being intended for defoliation, desiccation or regulation of plant growth.

For example, Patent document EP 1172034, published on 16 Jan. 2002, shows an agricultural sprayer comprising a chassis that supports, on the one hand a tank containing treatment slurry, and on the other hand a plurality of spraying nozzles disposed at substantially regular intervals over a sprayer boom.

When the spraying is performed, the agricultural sprayer is moved following an advancing direction over a field that contains plants to be treated. The sprayer boom is disposed crosswise to said advancing direction, on both sides of a middle vertical plane of said sprayer, spraying the treatment slurry over the plants to be treated.

The sprayer boom is supported by a latticed metal structure the lower bar of which supports the spraying nozzles. Said latticed structure is advantageously shortened into articulated sections. Therefore, said sprayer boom may be folded at several parts to reduce the total width of the sprayer for transport.

Known sprayer boom supports have the disadvantage of being very heavy, since they are manufactured in metal. In fact, given the weight of the material they are manufactured with, they require a latticed structure in order to maintain the horizontality required in the lower bar, which supports the spraying nozzles. All that latticed metal structure implies a great weight, which limits the length of the structure due to buckling and the vibrations that occur when the sprayer circulates during work in the field.

The buckling along with vibrations produces breakage in the structure that requires taking the sprayer out of the field and taking it to a workshop to correct the breakage by welding, with the resulting loss of working time.

The weight of the latticed structure also affects the speed at which the sprayer can perform. Going very fast may lead to breakage of the structure and the known loss of time and resources.

Similarly, the weight of the structure has an effect when turning at the end of the field. The inertia of the latticed structure hinders the turn and it is necessary to almost stop in order to guide the sprayer in the right direction.

On the other hand, the treatment products that are sprayed are highly corrosive, which promotes deterioration of the metal with which the structure is manufactured and favours breakage.

There is thus a need to design a sprayer boom support that allows eliminating the aforementioned drawbacks, achieving plant treatment with greater yield and efficiency.

DESCRIPTION OF THE INVENTION

The present invention is established and characterised in the independent claims, while the dependent claims describe additional characteristics thereof.

In view of the above, this invention relates to a sprayer boom support for agricultural sprayers, whether towed or self-propelled.

The support includes two identical articulated arms that can be arranged at one and other side of the sprayer, which may be extended sideways to the direction of movement. To do this, said articulated arms are coupled in an articulated manner to a central support section of the sprayer chassis.

Each articulated arm is in turn comprised of sections of bar made of a composite material consisting in a reinforcing agent and a matrix. The reinforcing agent is chosen from carbon fibre, fibreglass, aramid fibre, boron fibre or a combination thereof, and the matrix is an epoxy, vinyl ester, phenolic or polyester resin.

On the other hand, the bar sections have a tube geometry with a substantially rectangular cross section, that is, it is not a section with straight sides and vertices, but rather with rounded vertices and arched sides, with the length of two equal sides being constant throughout the bar section.

The conformation of the bar sections of the articulated arms with the material and the geometric configuration described above allow a considerable reduction in weight of the articulated arm structure, as well as greater fatigue strength of the material, thus promoting the design of a sprayer boom support formed by longer articulated arms, that is, with a greater width of application.

On the other hand, it does not require a heavy latticed structure in order to maintain the horizontality of the bar sections that support the spraying nozzles, thus reducing the weight and number of elements in the structure required to support the sprayer boom.

All this allows performing field work with greater speed, without the inertia provided by the weight of the articulated arms affecting the turns and covering more plants to be treated in each pass and using less fuel, which translates into greater productivity with greater yield and efficiency. On the other hand, since less passes are required in each field, there shall also be less compaction of the soil.

Similarly, due to the material the bar sections are manufactured with and their cross section that keeps the length of two equal sides constant along the entire span, it would be easy and fast to repair a damaged bar section in the field in the event of breakage, without having to go to a workshop that may be far from where the work is being performed. For example, a repair kit may be provided that would be simple enough that the sprayer operator may use it themselves.

The repair kit consists of two parts, manufactured in the same material as the bar sections that form the articulated arms, which internally reproduce the outside of half of the cross section of the bar section to be repaired. Such parts are stuck together wrapped around the equal sides that keep their length along the damaged bar section and are finally fastened to said bar section via screws, rivets or other similar fastening means.

Another noticeable advantage is that the articulated arms that form the support are not damaged by the use of the highly corrosive products that are commonly used in the treatment of plants.

BRIEF DESCRIPTION OF THE DRAWINGS

This specification is supplemented with a set of drawings illustrating the preferred embodiment, which are never intended to limit the invention.

DETAILED EXPLANATION OF THE PREFERRED EMBODIMENT OF THE INVENTION

This invention is a sprayer boom support for agricultural sprayers, whether towed or self-propelled.

Figure 1:
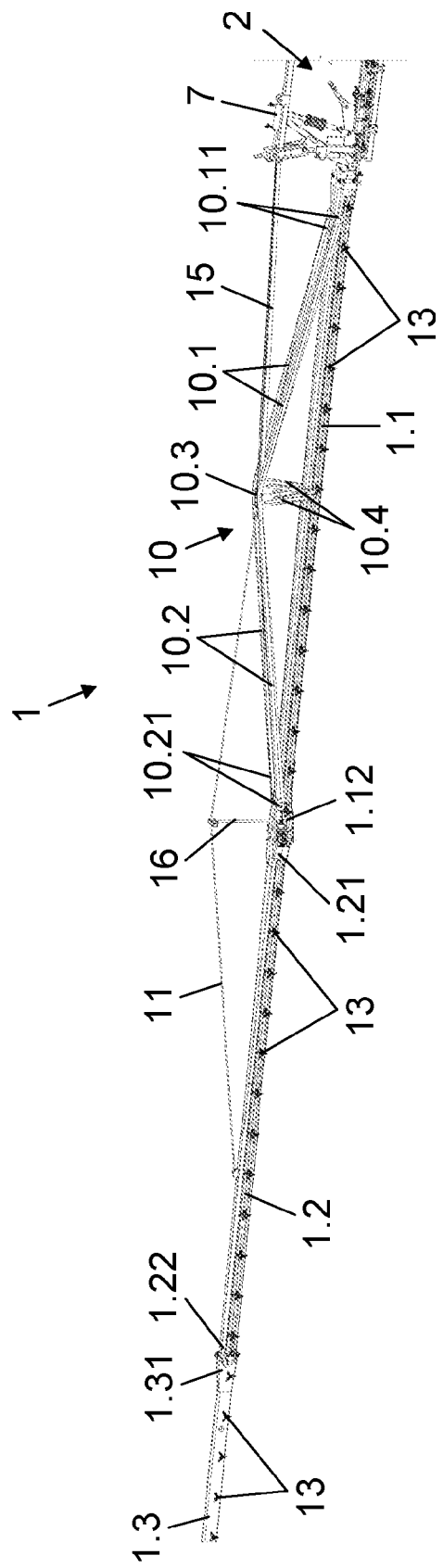
FIG. 1 represents a perspective view of one of the articulated arms that form the sprayer boom support.

The support includes two articulated arms (1) such as the one shown in FIG. 1, identical to one another and disposed at either side of the sprayer (not shown in the figures). Said arms (1) are extended crosswise to the advancing direction of the sprayer and are coupled in an articulated manner to a central support section (2) of the chassis of said sprayer.

Each articulated arm (1) is comprised by bar sections (1.1, 1.2, 1.3) formed from a composite material consisting of a reinforcing agent chosen from carbon fibre, fibreglass, aramid fibre, boron fibre or a combination thereof and a matrix of epoxy, vinyl ester, phenolic or polyester resin.

Figure 2:
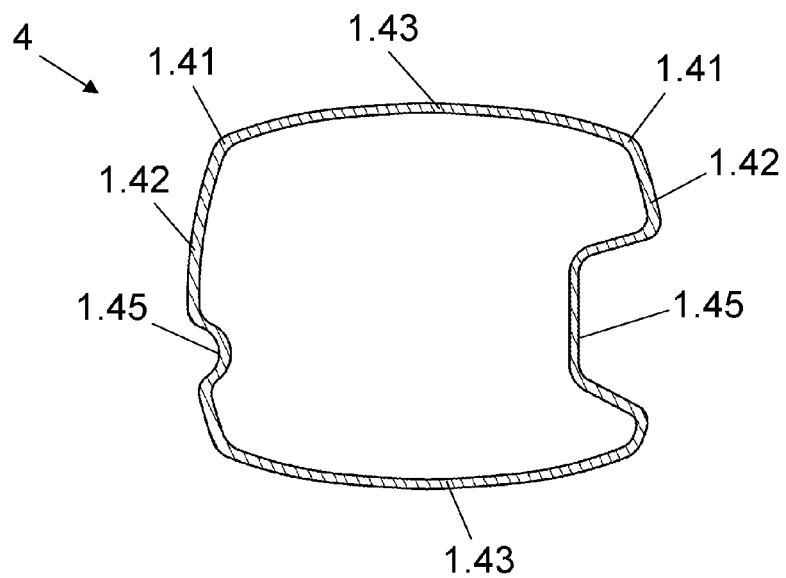
FIG. 2 represents a cross sectional view of one of the bar sections forming the articulated arm of FIGS. 1.
Figure 2A:
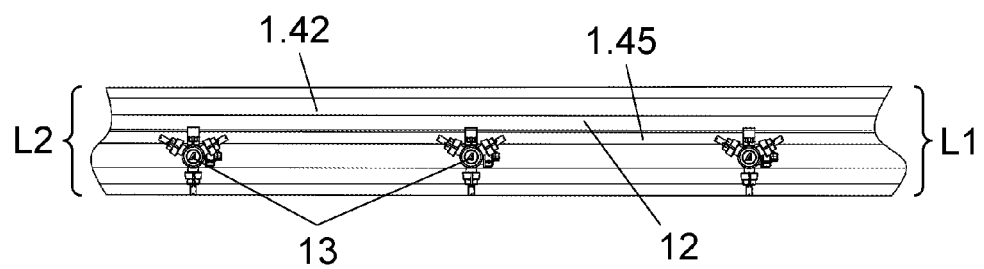
FIG. 2a represents a sectioned lateral view of the bar section of FIG. 2.
Figure 2B:
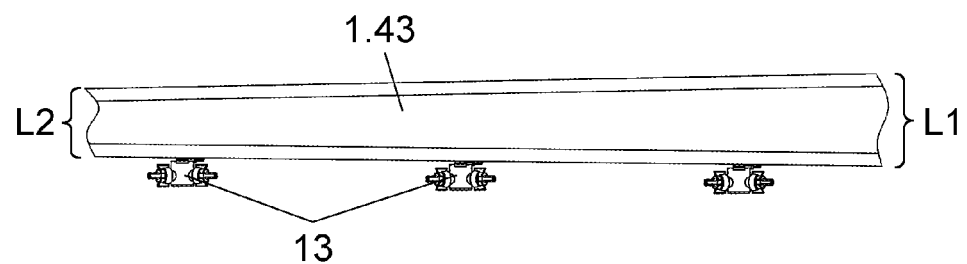
FIG. 2b represents a sectioned top view of the bar section of FIG. 2.

As shown in FIG. 2, the bar sections (1.1, 1.2, 1.3) have a substantially rectangular cross-sectional tube geometry (1.4), that is, its vertices and sides are not entirely straight, but rather such cross section follows a rectangular section but with rounded vertices (1.41) and arched sides (1.42, 1.43). On the other hand, the length of two equal sides (1.42) is kept constant throughout the bar section (1.1, 1.2, 1.3), see FIG. 2a (L1=L2), in contrast to the length of the other to equal sides (1.43), which decrease towards the end of the bar section (1.1, 1.2, 1.3) that is furthest from the sprayer, see FIG. 2b (L1>L2).

This structural configuration allows using bar sections (1.1, 1.2, 1.3) of the material described above, forming much longer articulated arms (1) with a third of the weight of a latticed metal structure of those that form the articulated arms of known sprayers. In other words, the low weight of the material used, as well as the given structural configuration allow the use of bar sections (1.1, 1.2, 1.3) that are longer and with greater fatigue strength and that can be kept horizontal without requiring a heavy latticed structure to do so.

To the same end, it is preferred that the equal sides (1.42) of the cross section (1.4) that keep their length constant are arranged perpendicularly to the travel direction of the sprayer and comprise stiffening ridges (1.44, 1.45) in the form of recesses, understood to be all along the bar section (1.1, 1.2, 1.3).

Similarly, it is preferred that the rear stiffening ridge (1.45), arranged on the side (1.42) that is to the rear of the advance of the sprayer, houses the pipes (12) and the spraying nozzles (13) that form the sprayer boom.

On the other hand, it is preferred that fork-shaped ends (1.11, 1.12, 1.21, 1.22, 1.31) are formed in the composite material of each bar section (1.1, 1.2, 1.3), said ends (1.11, 1.12, 1.21, 1.22, 1.31) being strengthened with additional layers of reinforcing agent of the composite material. This allows the holds, fastenings, joints of the bar sections (1.1, 1.2, 1.3) to be completely integrated to the body of said bar section as a single piece, achieving a reduction in weight and the increase of fatigue strength in the material.

Therefore, it is preferred that the bar sections (1.1, 1.2, 1.3) forming each articulated arm (1) are an internal bar section (1.1), an intermediate bar section (1.2) and an external bar section (1.3).

Figure 3:
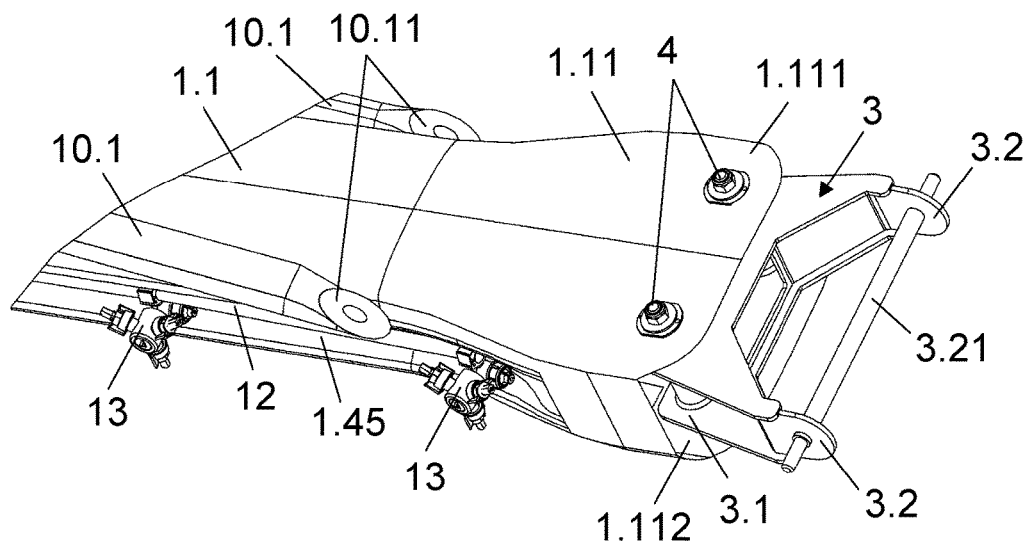
FIG. 3 represents a sectioned perspective view of the first end of the internal bar section coupled to the part joining the articulated arm of FIG. 1 to the central support of the sprayer chassis.

As can be seen in FIG. 3, preferably the first fork-shaped end (1.11) of the internal bar section (1.1) comprises tabs (1.111, 1.112) between which a first portion (3.1) of a joining piece (3) of the articulated arm (1) is tightly coupled to the central support section (2).

The tabs (1.111, 1.112) of the first fork-shaped end (1.11) of the internal bar section (1.1) are fixed to the first portion (3.1) of the joining piece (3) via two shear pins (4) that cross them, such shear pins (4) being arranged aligned with one another perpendicularly to the length of the internal bar section (1.1).

The joining piece (3) comprises a second portion (3.2) that includes a first shaft (3.21) arranged in a perpendicular direction to the shear pins (4), which allows articulation between the internal bar section (1.1) and the central support section (2).

Figure 4:
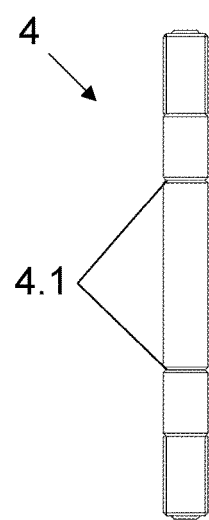
FIG. 4 represents a front view of one of the shear pins that hold the internal bar section together with the joining part, shown in FIG. 3.

In turn, as shown in FIG. 4, the shear pins (4) comprise respective weakening areas (4.1) that coincide with the surface contacts between the tabs (1.111, 1.112) and the joining piece (3).

Thus, if during work in the field one of the articulated arms (1) hits an obstacle, specifically, in the area of the internal (1.1) and intermediate (1.2) bar sections, as a result of the torque generated by the knocking on the arm (1); the shear pin (4) on the side of the obstacle will shear at its weakening areas (4.1), and the articulated arm (1) will rotate over another shear pin (4), avoiding damage on such bar sections (1.1, 1.2).

It would then be sufficient, in order to resume work, to place the articulated arm (1) back in its initial position, placing a new shear pin (4) in the place of the damaged one in order to once again fasten the internal bar section (1.1) to the first portion (3.1) of the joining piece (3).

Figure 5:
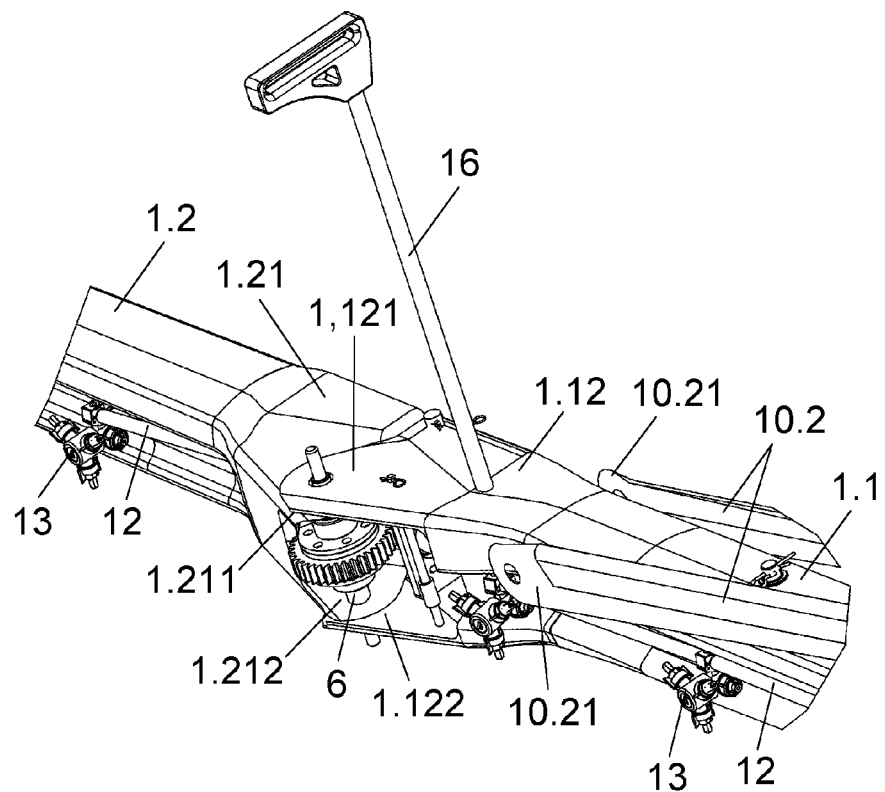
FIG. 5 represents a sectioned perspective view of the joint between the second end of the internal bar section and the first end of the intermediate bar section of the articulated arm of FIG. 1.
Figure 6:
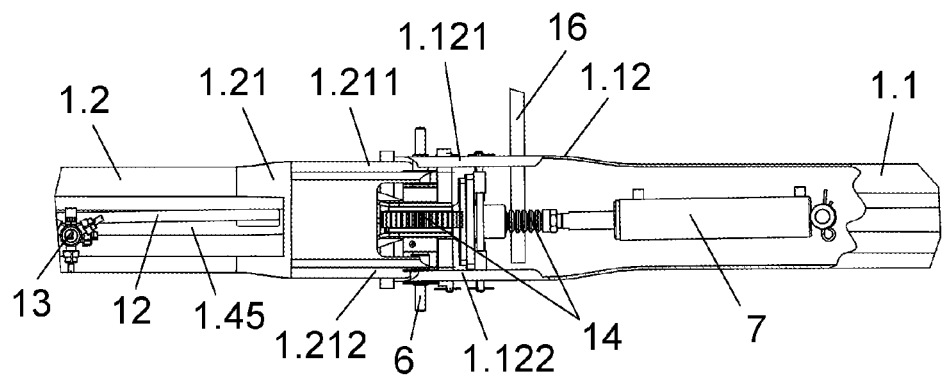
FIG. 6 represents a cross-section of a lateral view of FIG. 5.

Similarly, as shown in FIGS. 5 and 6, it is preferred that the second fork-shaped end (1.12) of the internal bar section (1.1) comprises tabs (1.121, 1.122) between which are tightly coupled tabs (1.211, 1.212) of the first fork-shaped end (1.21) of the intermediate bar section (1.2). Such tabs (1.121, 1.122, 1.211, 1.212) would then be joined via a second shaft (6) that allows articulation between the internal bar section (1.1) and the intermediate bar section (1.2).

As can be better observed in FIG. 6, it is preferred that the articulation between the internal bar section (1.1) and the intermediate bar section (1.2) consists in a rack-pinion mechanism (14) arranged on the second shaft (6).

Preferably, both the articulation between the internal bar section (1.1) and the central support section (2) as well as the articulation between the internal bar section (1.1) and the intermediate bar section (1.2) are actuated by hydraulic operation means (7) that act on the central brace (15) and the rack-pinion mechanism (14) respectively. It is thus possible to extend the articulated arms (1) on both sides of the sprayer in order to carry out field work, or to fold in said arms (1) for travel outside the field.

Figure 7:
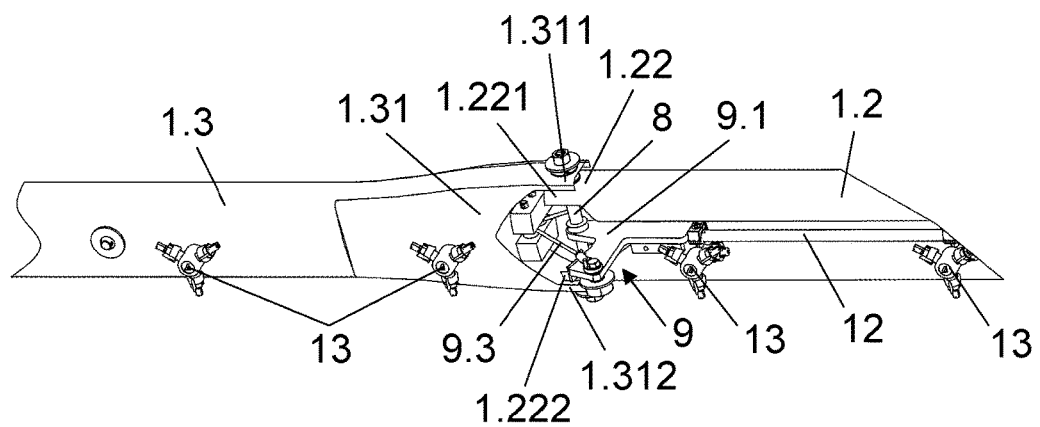
FIG. 7 represents a sectioned perspective view of the joint between the second end of the intermediate bar section and the first end of the external bar section of the articulated arm of FIG. 1.
Figure 8:
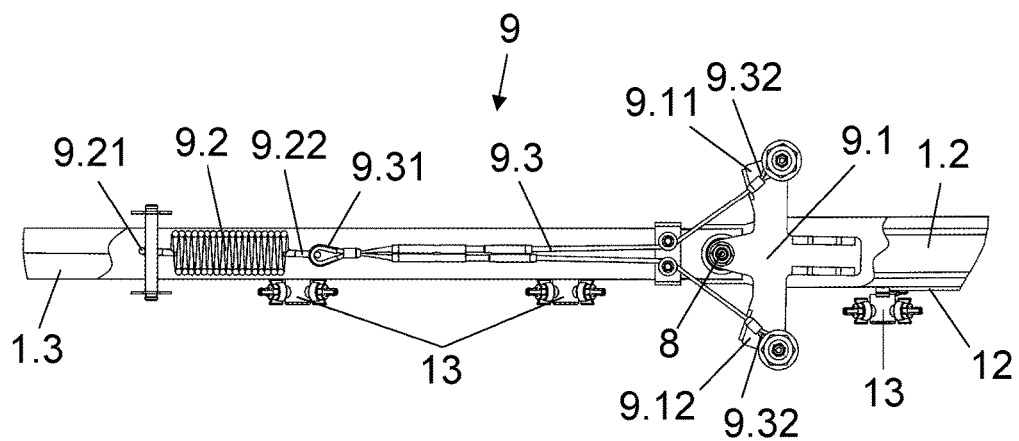
FIG. 8 represents a cross-section of a top view of FIG. 7.

Similarly, as shown in FIGS. 7 and 8, it is preferred that the second fork-shaped end (1.22) of the intermediate bar section (1.2) comprises tabs (1.221, 1.222) that tightly couple between tabs (1.311, 1.312) of the first fork-shaped end (1.31) of the external bar section (1.3). Said tabs (1.221, 1.222, 1.311, 1.312) are joined via a third shaft (8) that allows articulation between the intermediate bar section (1.2) and the external bar section (1.3).

In turn, the articulation between the internal bar section (1.2) and the external bar section (1.3) is preferably actuated by recovery means (9) from the extended position of the external bar section (1.3).

The recovery means (9) comprise a transverse flat bar (9.1) fastened to one of the bar sections (1.2, 1.3), an elastic element (9.2) fastened on a first end (9.21) to the other bar section (1.2, 1.3) and a tensed cable (9.3) with three couplings (9.31, 9.32, 9.33) with a central coupling (9.31) fixed to a second end (9.22) of the elastic element (9.2) and both end couplings (9.32) opposite to the first, fixed to ends (9.11, 9.12) of the transverse flat bar (9.1).

The external bar section (1.3) is thus articulated against an obstacle that may exist in the field in which the sprayer is working. Thanks to the recovery means (9), said external bar section (1.3) does not offer resistance to the obstacle and folds and recovers its extended position once said obstacle has been passed.

As we have seen, the articulated arms (1) comprise means that prevent breakage of their bar sections (1.1, 1.2, 1.3) against obstacles that may be found while the sprayer is working. In addition, said sprayer can be implemented with a repair kit for said bar sections, which can be applied by the sprayer operator, so that they can easily and quickly repair it on the field itself, without having to go to a workshop that may be distant to where the work is being performed.

Figure 9:
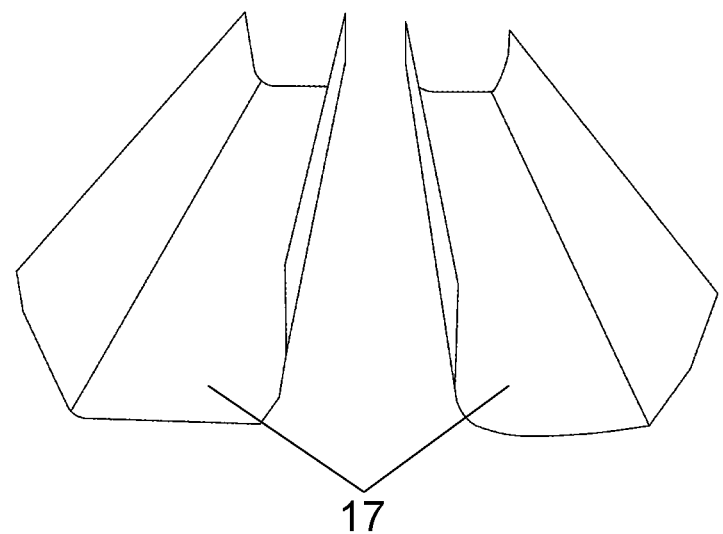
FIG. 9 is a schematic representation of the parts of the repair kit for one of the bar sections of the articulated arm shown in FIGS. 1.

For example, as can be seen in FIG. 9, the kit may comprise two parts (17) that are shaped as a channel, manufactured in the same material as the bar sections (1.1, 1.2, 1.3) that make up the articulated arms (1), said parts (17) internally reproducing the exterior of half of the cross section (1.4) of the bar section (1.1, 1.2, 1.3) to be repaired.

Figure 10:
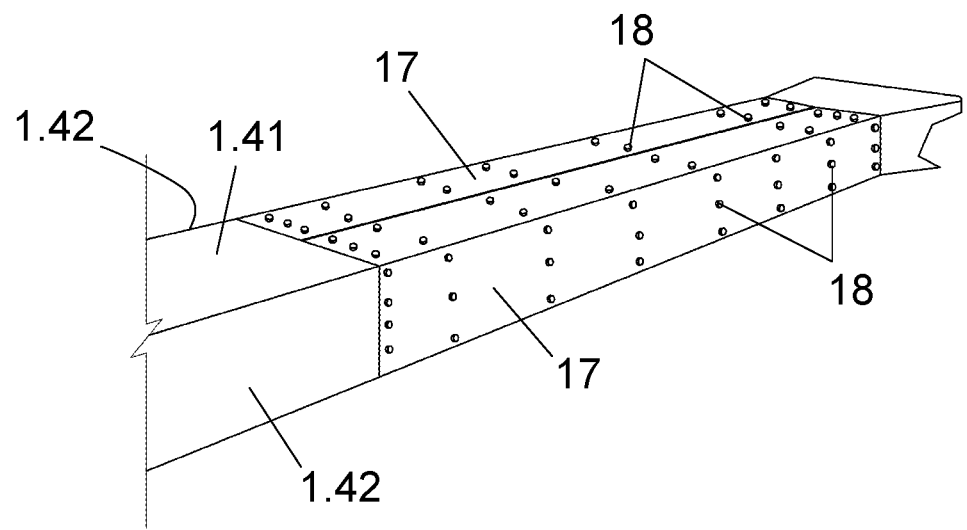
FIG. 10 is a schematic representation of the parts of the repair kit shown in FIG. 9, fixed to one of the bar sections of the articulated arm of FIG. 1.

As shown in FIG. 10, such parts (17) are fastened around the equal sides (1.42) that keep their length along the damaged bar section (1.1, 1.2, 1.3) and are finally fixed to said bar section (1.1, 1.2, 1.3) via screws, rivets or other similar fastening means (18).

On the other hand, it is preferred that the internal bar section (1.1) is arched and is assembled pre-tensed in a brace strut (10) made of carbon fibre composite material, thus helping to maintain its straightness as required for spraying work. Said brace strut (10) is formed by two pairs of transverse tensors (10.1, 10.2) arranged as the equal sides of an isosceles triangle, the free ends (10.11, 10.21) of which are fastened to the first (1.11) and second (1.12) end of the internal bar section (1.1), respectively.

Between the apex (10.3) formed between transverse tensors (10.1, 10.2) and the centre of the internal bar section (1.1), the brace strut (10) includes a pair of columns (10.4). Both the pairs of transverse tensors (10.1, 10.2) and the pairs of columns (10.4) are fastened to the top portion of the equal sides (1.42) of the internal bar section (1.1) and between them, to the apex (10.3).

Similarly, the central brace strut (10) through which the articulation between the internal bar section (1.1) and the central support section (2) is actuated is arranged between said central support section (2) and the apex (10.3) formed in the brace strut (10).

Likewise, in order to help keep the intermediate bar section (1.2) straight, we prefer to use a second brace strut (11) consisting in a dyneema fibre rope with one end fastened to the apex (10.3) of the brace strut (10) and the other end fastened to the upper part of the intermediate bar section (1.2). The second brace strut (11) is centrally resting on a crosspiece (16) that is vertically arranged on the second end (1.12) of the internal bar section (1.1).

On the other hand, in the case that an air curtain is required to aid the spraying, it is preferred that the inside of the bar sections (1.1, 1.2, 1.3) forms an air duct of the sprayer boom for liquid to be sprayed.

The invention claimed is:

1. Sprayer boom support for agricultural sprayer, including two articulated arms (1) that are identical and can be arranged on either side of the sprayer and extended crosswise to the travel direction, the articulated arms (1) are coupled in an articulated manner to a central support section (2) of the sprayer chassis, each articulated arm (1) is comprised by bar sections (1.1, 1.2, 1.3) having a tube geometry with a substantially rectangular cross section (1.4) with rounded vertices (1.41) and arched sides (1.42, 1.43), characterised in that the bar sections (1.1, 1.2, 1.3) are formed in a composite material that consists of a reinforcing agent chosen from carbon fibre, fibreglass, aramid fibre, boron fibre or a combination thereof, and a matrix of epoxy, vinyl ester, phenolic or polyester resin, the cross section (1.4) keeps the length of two equal sides (1.42) constant along the bar section (1.1, 1.2, 1.3), said equal sides (1.42) of the cross section (1.4) that keep their length constant are arranged perpendicularly to the travel direction of the sprayer and comprise stiffening ridges (1.44, 1.45) in the form of recesses, distributed along the entire bar section (1.1, 1.2, 1.3).

2. A support according to claim 1 wherein fork-shaped ends (1.11, 1.12, 1.21, 1.22, 1.31) are formed in the composite material of each bar section (1.1, 1.2, 1.3).

3. A support according to claim 2 wherein the fork-shaped ends (1.11, 1.12, 1.21, 1.22, 1.31) of the bar sections (1.1, 1.2, 1.3) are strengthened with additional layers of the reinforcing agent of the composite material.

4. A support according to claim 1 wherein the bar sections (1.1, 1.2, 1.3) forming each articulated arm (1) are an internal bar section (1.1), an intermediate bar section (1.2) and an external bar section (1.3).

5. A support according to claim 4 wherein the internal bar section (1.1) is arched and is assembled pre-tensed in a brace strut (10) of carbon fibre composite material.

6. A support according to claim 1 wherein fork-shaped ends (1.11, 1.12, 1.21, 1.22, 1.31) are formed in the composite material of each bar section (1.1, 1.2, 1.3) and wherein the bar sections (1.1, 1.2, 1.3) forming each articulated arm (1) are an internal bar section (1.1), an intermediate bar section (1.2) and an external bar section (1.3).

7. A support according to claim 6 wherein between tabs (1.111, 1.112) of the first fork-shaped end (1.11) of the internal bar section (1.1) a first section (3.1) of a joining part (3) of the articulated arm (1) is tightly coupled to the central support section (2).

8. A support according to claim 7 wherein the tabs (1.111, 1.112) of the first fork-shaped end (1.11) of the internal bar section (1.1) are fixed to the first portion (3.1) of the joining piece (3) via two shear pins (4) that cross them, such shear pins (4) being arranged aligned with one another perpendicularly to the length of the internal bar section (1.1).

9. A support according to claim 8 wherein the shear pins (4) comprise respective weakening areas (4.1) that coincide with the surface contacts between the tabs (1.111, 1.112) and the joining piece (3).

10. A support according to claim 8 wherein the joining piece (3) comprises a second portion (3.2) that includes a first shaft (3.21) arranged in a perpendicular direction to the shear pins (4), which allows articulation between the internal bar section (1.1) and the central support section (2).

11. A support according to claim 10 wherein the articulation is actuated by hydraulic operation means (7).

12. A support according to claim 6 wherein between tabs (1.121, 1.122) of the second fork-shaped end (1.12) of the internal bar section (1.1) are tightly coupled tabs (1.211, 1.212) of the first fork-shaped end (1.21) of the intermediate bar section (1.2), such tabs (1.121, 1.122, 1.211, 1.212) being joined via a second shaft (6) that allows articulation between the internal bar section (1.1) and the intermediate bar section (1.2).

13. A support according to claim 12 wherein the articulation is actuated by hydraulic operation means (7).

14. A support according to claim 6 wherein tabs (1.221, 1.222) of the second fork-shaped end (1.22) of the intermediate bar section (1.2) are tightly coupled between tabs (1.311, 1.312) of the first fork-shaped end (1.31) of the external bar section (1.31), such tabs (1.221, 1.222, 1.311, 1.312) being joined via a third shaft (8) that allows articulation between the intermediate bar section (1.2) and the external bar section (1.3).

15. A support according to claim 14 wherein the articulation is actuated by recovery means (9) of the extended position of the external bar section (1.3) that comprise a transverse flat bar (9.1) fastened to one of the bar sections (1.2, 1.3), an elastic element (9.2) fastened on a first end (9.21) to the other bar section (1.2, 1.3) and a tensed cable (9.3) with three couplings (9.31, 9.32, 9.33), with a central coupling (9.31) fixed to a second end (9.22) of the elastic element (9.2) and both end couplings (9.32) opposite to the first, fixed to ends (9.11, 9.12) of the transverse flat bar (9.1).

16. A support according to claim 1 wherein the inside of the bar sections (1.1, 1.2, 1.3) form an air duct for the sprayer boom of liquid to be sprayed.

* * * * *